United States Patent
Jiang

(10) Patent No.: US 11,436,573 B2
(45) Date of Patent: Sep. 6, 2022

(54) DATA PROCESSING METHOD, RELATED APPARATUS, AND SYSTEM

(71) Applicant: HUAWEI TECHNOLOGIES CO., LTD., Guangdong (CN)

(72) Inventor: Heng Jiang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/212,610

(22) Filed: Dec. 6, 2018

(65) Prior Publication Data

US 2019/0108497 A1 Apr. 11, 2019

Related U.S. Application Data

(63) Continuation of application No. PCT/CN2017/077734, filed on Mar. 22, 2017.

(30) Foreign Application Priority Data

Jun. 7, 2016 (CN) .......................... 201610398883.5

(51) Int. Cl.
*G06Q 20/04* (2012.01)
*G06Q 20/38* (2012.01)
*G06Q 20/12* (2012.01)
*G06Q 20/18* (2012.01)
*G06Q 20/32* (2012.01)

(52) U.S. Cl.
CPC ......... *G06Q 20/0457* (2013.01); *G06Q 20/12* (2013.01); *G06Q 20/18* (2013.01); *G06Q 20/3223* (2013.01); *G06Q 20/3255* (2013.01); *G06Q 20/385* (2013.01)

(58) Field of Classification Search
CPC ......... G06Q 40/00; G06Q 40/08; G06Q 20/00
See application file for complete search history.

(56) References Cited

U.S. PATENT DOCUMENTS 10,515,405 B2 * 12/2019 Sorbe .................... G06Q 40/00
2003/0028481 A1 * 2/2003 Flitcroft ............... G06Q 20/105
705/39

(Continued)

FOREIGN PATENT DOCUMENTS

CN 1442810 A 9/2003
CN 102004978 A 4/2011
(Continued)

*Primary Examiner* — Bennett M Sigmond
*Assistant Examiner* — Xavier M. Bennett
(74) *Attorney, Agent, or Firm* — Womble Bond Dickinson (US) LLP

(57) ABSTRACT

The present invention provides a data processing method and an apparatus. When a payment server makes a payment based on a payment amount and a payment instrument of a payer, the payment server has obtained merchant information and commodity information of a commodity to be paid for, and after the payment is successful, establishes a correspondence between a service verification code, the merchant information, and the commodity information. Therefore, after the payment server sends the service verification code to a terminal corresponding to the payer, a user can perform verification on a payment system based on the service verification code. This improves verification efficiency and decreases transaction costs.

17 Claims, 4 Drawing Sheets

(56) References Cited

U.S. PATENT DOCUMENTS

| | | | |
|---|---|---|---|
| 2006/0064372 A1* | 3/2006 | Gupta | G06Q 20/10 705/39 |
| 2007/0106612 A1* | 5/2007 | O'Brien | G06Q 20/02 705/44 |
| 2007/0162366 A1* | 7/2007 | Tanaka | G06Q 10/00 705/35 |
| 2007/0244811 A1* | 10/2007 | Tumminaro | G06Q 20/3255 705/39 |
| 2008/0319869 A1* | 12/2008 | Carlson | G06Q 20/02 705/26.1 |
| 2009/0006262 A1* | 1/2009 | Brown | G06Q 20/12 705/64 |
| 2010/0223164 A1* | 9/2010 | Fortier | G06Q 40/00 705/30 |
| 2012/0253852 A1* | 10/2012 | Pourfallah | G06Q 20/36 705/4 |
| 2013/0297414 A1* | 11/2013 | Goldfarb | G06Q 40/00 705/14.51 |
| 2014/0074726 A1 | 3/2014 | Lee et al. | |
| 2014/0279420 A1* | 9/2014 | Okerlund | G06Q 40/00 705/39 |
| 2015/0142541 A1* | 5/2015 | Fisher | G06Q 20/00 705/14.23 |

FOREIGN PATENT DOCUMENTS

| | | |
|---|---|---|
| CN | 102456194 A | 5/2012 |
| CN | 103020819 A | 4/2013 |
| CN | 103106742 A | 5/2013 |
| CN | 103186861 A | 7/2013 |
| CN | 105046478 A | 11/2015 |
| WO | 03096252 A1 | 11/2003 |
| WO | 2015184800 A1 | 12/2015 |

* cited by examiner

DATA PROCESSING METHOD, RELATED APPARATUS, AND SYSTEM

CROSS-REFERENCE TO RELATED APPLICATIONS

This application is a continuation of International Application No. PCT/CN2017/077734, filed on Mar. 22, 2017, which claims priority to Chinese Patent Application No. 201610398883.5, filed on Jun. 7, 2016, The disclosures of the aforementioned applications are hereby incorporated by reference in their entireties.

TECHNICAL FIELD

The present invention relates to the field of mobile communications technologies, and specifically, to a data processing method, a related apparatus, and a system.

BACKGROUND

Known as cellphone payment, mobile payment allows a user to use a mobile terminal to pay for a to-be-consumed commodity or service. A platform or system that provides a mobile payment service is called a mobile payment system, such as the Paypal payment system provided by the eBay company, the Alipay payment system provided by the Alibaba company, and the M-pesa payment system provided by the Vodafone company.

With the popularization of mobile payment, an increasing quantity of users use a website (for example, the Groupon group purchase website and the Amazon website) provided by a sales platform, or a self-service terminal to purchase a commodity or service provided by a service provider (or a commodity provider), for example, a bus ticket or a cinema ticket. After the user completes payment by using the mobile terminal, the sales platform sends a service verification code (also known as an e-ticket) to the mobile terminal using an SMS message. The user can request the commodity or service from the service provider (for example, a bus station or a cinema) based on the service verification code.

The user can obtain, based on the service verification code, a paper bus ticket or a paper cinema ticket from a self-service terminal provided by the sales platform and enjoy services based on the bus ticket or cinema ticket. In addition, the user may also directly present the service verification code to the service provider, so that the service provider verifies the service verification code with the sales platform, and provides services to the user based on a verification result.

However, a service provider usually sells commodities or services on multiple sales platforms to increase revenue. As a result, the multiple sales platforms need to provide self-service terminals (such as a Groupon self-service terminal and an Amazon self-service terminal) in a place where the service provider resides, or the service provider needs to verify, based on service verification codes provided by different sales platforms, the service verification codes on the different sales platforms. This increases transaction costs and leads to relatively low verification efficiency.

SUMMARY

Embodiments of the present invention provide a method and an apparatus for improving mobile payment efficiency.

According to an aspect, an embodiment of the present invention provides a data processing method applied to a payment server, including:

obtaining, by a payment server, commodity information of a commodity to be paid for, merchant information, a payment instrument of a payer, and payment amount data; making a payment based on the payment instrument of the payer, the merchant information, and the payment amount data; after the payment is successful, generating a service verification code used to verify the commodity, and establishing a correspondence between the service verification code, the merchant information, and the commodity information; and after the correspondence is established, sending a first notification message to a terminal corresponding to the payer, where the first notification message carries the service verification code.

In this embodiment of the present invention, when the payment server makes the payment based on the payment amount and the payment instrument of the payer, the payment server has obtained the merchant information and the commodity information of the commodity to be paid for, and after the payment is successful, establishes the correspondence between the service verification code, the merchant information, and the commodity information. Therefore, after the payment server sends the service verification code to the terminal corresponding to the payer, a merchant can perform verification on the payment system based on the service verification code. In this way, when the user who purchases commodities on different sales platforms and makes the payment by using a same payment system requests a commodity or a service from the merchant, the merchant only needs to verify a user-provided service verification code on the same payment system, instead of performing verification on different sales platforms. This improves verification efficiency and decreases transaction costs.

In one embodiment, the payment server can obtain the commodity information of the commodity to be paid for, the merchant information, and the payment amount data in the following manners:

The payment server receives a first payment request sent by the terminal corresponding to the payer, where the first payment request carries the payment instrument of the payer and the merchant information. In other words, the payment server obtains the merchant information and the payment instrument of the payer based on the first payment request.

The payment server receives a second payment request sent by a platform server, where the second payment request carries the commodity information of the commodity to be paid for, the merchant information, and the payment amount data. In other words, the payment server obtains the commodity information, the merchant information, and the payment amount data based on the second payment request.

In addition, if the first payment request contains the commodity information of the user-selected commodity, the merchant information, the payment instrument of the user, and the payment amount data, the payment server can obtain the foregoing information based on only the first payment request.

In one embodiment, the second payment request received by the payment server further carries a merchant instrument, and the payment server further verifies whether the merchant instrument carried in the second payment request is consistent with a locally stored merchant instrument.

If the merchant instrument carried in the second payment request is consistent with the locally stored merchant instrument, execution of the operation of making a payment based on the payment instrument of the payer, the merchant information, and the payment amount data is triggered. Otherwise, the data processing process is stopped.

In this embodiment, the merchant instrument of the merchant is verified, so as to avoid payment information embezzlement by an unauthorized merchant and improve data processing security.

In one embodiment, when the user performs consumption at the merchant based on the verification code and the merchant information, the payment server receives a verification request from a verification terminal of the merchant, where the verification request carries the merchant information and a user-entered service verification code. Then, the payment server searches the previously stored correspondence for the commodity information corresponding to the merchant information and the service verification code that are carried in the verification request, and returns to the verification terminal, and the merchant provides the commodity or service to the user based on the information returned by the payment server. If the payment server cannot find the corresponding commodity information, the merchant does not provide the commodity or service to the user.

In one embodiment, if the paying user further wishes another terminal to receive the service verification code, the payment server can also obtain an identifier of the terminal that receives the service verification code, and then sends a second notification message to the terminal that receives the service verification code. The second notification message carries the service verification code, the commodity information, and the merchant information. Accordingly, a user holding the another terminal can perform consumption at the merchant based on the received service verification code, improving flexibility of consumption.

In one embodiment, to further improve data processing security, after obtaining the identifier of the terminal that receives the service verification code, the payment server further establishes the correspondence between the service verification code and the identifier of the terminal that receives the service verification code, and verifies the correspondence between the verification terminal and the service verification code in subsequent consumption. This avoids fraudulent use of the service verification code by another person and improves mobile payment security.

In one embodiment, the first payment request received by the payment server from the platform server further carries an order number used to identify a transaction event. After the payment server has made a payment successfully, the payment server sends a third notification message to the platform server, where the third notification message carries the order number. Then, the platform server can associate the commodity information, the merchant information, and information about the paying user based on the order number, to facilitate subsequent data maintenance, such as querying, accounting, and settlement.

According to another aspect, an embodiment of the present invention provides a payment server. The payment server has functions to implement the data processing method in the first aspect. The functions can be implemented by hardware modules or through software execution by hardware.

In one embodiment, the payment server includes: a first obtaining module configured to obtain commodity information of a commodity to be paid for, merchant information, a payment instrument of a payer, and payment amount data; a data processing module configured to make a payment based on the payment instrument of the payer, the merchant information, and the payment amount data obtained by the first obtaining module; an association module configured to: after the payment is successful, generate a service verification code used to verify the commodity, and establish a correspondence between the service verification code, the merchant information, and the commodity information; and a first sending module configured to send a first notification message to a terminal corresponding to the payer, where the first notification message carries the service verification code.

In one embodiment, the payment server further includes: a first receiving module configured to receive a verification request sent by a verification terminal, where the verification request carries the merchant information and a user-entered service verification code; and a searching module configured to search the correspondence established by the association module for commodity information corresponding to the merchant information and the service verification code that are carried in the verification request, and return the commodity information to the verification terminal. Then, the merchant provides the commodity or service to the user based on the information returned by the payment server. If the payment server cannot find the corresponding commodity information, the merchant does not provide the commodity or service to the user.

In one embodiment, the first obtaining module of the payment server is further configured to obtain an identifier of the terminal that receives the service verification code, and the first sending module is further configured to send a second notification message to the terminal that receives the service verification code, where the second notification message carries the service verification code, the commodity information, and the merchant information. Accordingly, a user holding the another terminal can perform consumption at the merchant based on the received service verification code, improving consumption flexibility.

In one embodiment, that the first obtaining module of the payment server obtains the commodity information of the commodity to be paid for, the merchant information, and the payment amount data may include: the first obtaining module receives a first payment request sent by the terminal corresponding to the payer, where the first payment request carries the payment instrument of the payer and the merchant information. In other words, the first obtaining module obtains the payment instrument of the payer and the merchant information based on the first payment request. The first obtaining module receives a second payment request sent by a platform server, where the second payment request carries the commodity information of the commodity to be paid for, the merchant information, and the payment amount data. In other words, the first obtaining module learns the commodity information, the merchant information, and the payment amount data based on the second payment request.

In one embodiment, the first payment request received by the payment server further carries an order number used to identify a transaction event. The first sending module is further configured to send a third notification message to the platform server after the payment is successful and the third notification message carries the order number. In this way, the platform server learns that the order is paid successfully and records the payment at a background.

With reference to the embodiments in the first aspect and the second aspect, the second notification message sent by the payment server may further carry the commodity information and the merchant information, so as to provide more information to the terminal that receives the service verification code.

With reference to the embodiments in the first aspect and the second aspect, the commodity information is information about a commodity name or quantity, the merchant information is a merchant name or address information, and the payment instrument of the payer is a user and a password of the payer registered with the payment system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
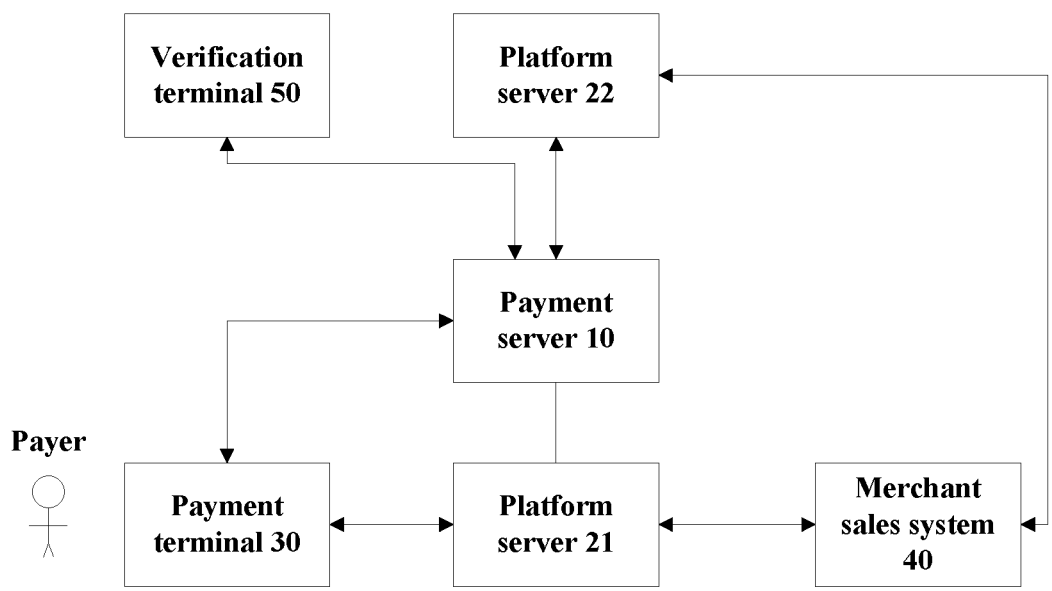
FIG. 1 is a schematic networking diagram of a data processing system according to one embodiment of the present invention.

The present invention provides a data processing method, a related apparatus, and a system. Referring to FIG. 1, FIG. 1 is a schematic networking diagram of a data processing system according to one embodiment of the present invention.

As shown in FIG. 1, the data processing system according to the present invention may be applied to a payment scenario provided in the background. The system mainly includes a payment server 10, platform servers 21 and 22, a payment terminal 30, a verification terminal 50, and a merchant sales system 40.

The platform servers 21 and 22 and the payment terminal 30 are all registered with the same payment server 10. As a background device of the payment system, the payment server 10 is mainly configured to process related payment data submitted by the platform servers 21 and 22 or by the payment terminal 30, and perform account processing. The platform servers 21 and 22 and the payment server 10 may be deployed on a universal server and include components such as a processor, a memory, a hard disk, and a bus.

As a background device of a sales platform, the platform servers 21 and 22 display commodities for sale on web pages provided by the platform servers 21 and 22. A user may operate the payment terminal 30 to access the web pages provided by the platform servers 21 and 22 and view the commodities for sales. In addition, the platform servers 21 and 22 are both connected to the merchant sales system 40 and obtain commodity information, such as an inventory, from the merchant sales system 40. A commodity of a merchant may be sold independently on the two platform servers 21 and 22. For example, a cinema A releases a cinema ticket product on the Groupon group purchase website and the Amazon website at the same time. Respective platform servers of the Groupon group purchase website and the Amazon website are all connected to a ticket sales system of the cinema. After a user makes a successful payment for the commodity, the platform servers 21 and 22 notify the merchant sales system 40 that the commodity is sold out.

The payment terminal 30 may be a mobile terminal with an application installed. A user may use the application on the mobile terminal to view commodities for sale on the platform servers 21 and 22. A shopping application corresponding to the platform servers 21 and 22 may be installed on the mobile terminal. This shopping application may also be called a shopping client, such as the Amazon client. A payment application (this payment application may be called a payment client, such as the Paypal client that uses the technical solutions in the present invention) corresponding to the payment server 10 may also be installed on the mobile terminal. The payment application and the shopping application may be installed on a subscriber identification module (SIM) card or an intelligent operating system (such as an Android or iOS system) of the mobile terminal.

The payment terminal 30 may also be an ordinary personal computer (PC). A user may access, by using a browser on the PC, the web pages provided by the platform servers 21 and 22, to view the commodities for sale on the platform servers 21 and 22.

The verification terminal 50 is connected to the payment server 10 and is configured to verify a user-provided service verification code. The service verification code is used to verify whether a commodity requested by the user in consumption at a merchant is consistent with a commodity purchased by the user on the platform server 21 or 22. The verification terminal 50 may be a self-service terminal. After the verification is successful, the self-service terminal prints a paper bus ticket or a paper cinema ticket, or outputs a commodity. The verification terminal 50 may alternatively be a mobile terminal that provides a verification function. An application corresponding to the payment server 10 is installed on the mobile terminal and the application provides the verification function.

In the data processing system according to this embodiment of the present invention, a plurality of users access shopping platforms provided by the different platform servers 21 and 22, and purchase a commodity provided by a same merchant. These different users choose a same payment system for payment. After the payment is successful, the payment server stores commodity information and corresponding merchant information. When the users perform subsequent consumption at the merchant, the merchant only needs to use the payment system to verify the information about a commodity to be purchased by the user, instead of performing verification on different shopping platforms. This improves verification efficiency and decreases transaction costs.

Figure 2:
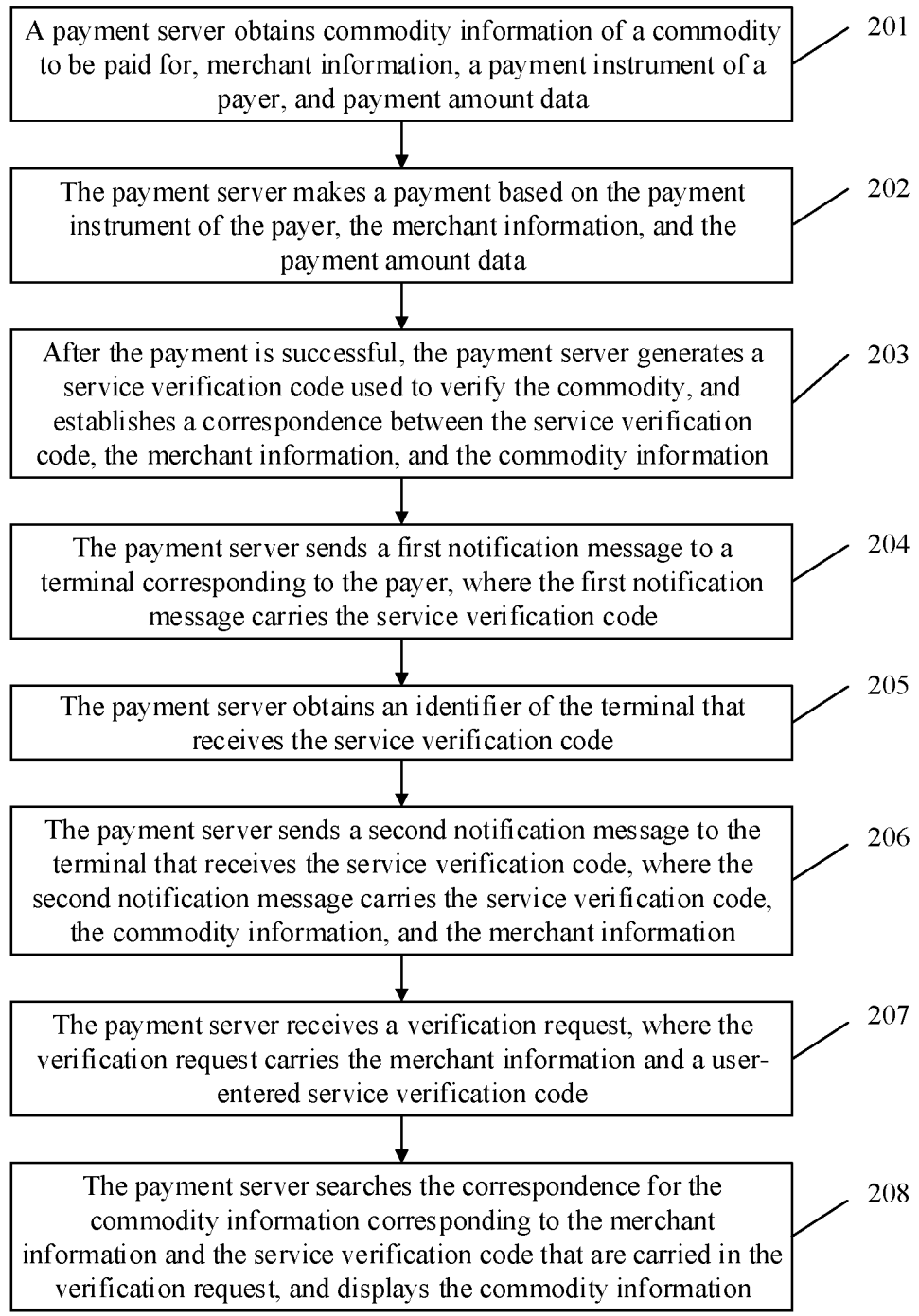
FIG. 2 is a flowchart of a data processing method according to one embodiment of the present invention.

For ease of understanding of the embodiments of the present invention, the following provides a detailed method procedure to elaborate embodiments of the present invention. Referring to FIG. 2, FIG. 2 is a flowchart of a data processing method performed by using, for example, the data processing system as shown in FIG. 1, according to one embodiment of the present invention.

In this embodiment of the present invention, a user views a commodity for sale on the platform server 21 by using the payment terminal 30. After determining the commodity to be purchased, the user selects a payment system to make a payment. Then, the payment server 10 shown in FIG. 1 starts to execute the following operations:

Operation 201. The payment server obtains commodity information of a commodity to be paid for, merchant information, a payment instrument of a payer, and payment amount data.

The payment terminal used by the user (the payer) can send a first payment request to the payment server corresponding to the payment system. The first payment request carries commodity information of the commodity (such as a cinema ticket) selected by the user, the merchant information, the payment instrument of the user, the payment amount data, and the like.

Specifically, the commodity information can be a commodity name or quantity, and the merchant information can be a merchant name or address information. The payment instrument of the payer can be a user name that is registered by the payer with the payment server, or a user name and a password that are registered by the payer with the payment server. The payer may perform registration with the payment system before requesting a payment. The registered user name and password can be stored in the payment server.

In addition, if the user uses a PC to access a web page provided by the platform server, selects an appropriate commodity, and selects to make a payment, the payment server receives two payment requests, respectively from the PC and the platform server. A first payment request sent by the PC can carry the payment instrument of the payer, the merchant information, the commodity information, and the payment amount data. A second payment request sent by the platform server carries the commodity information of the commodity to be paid for, the merchant information, the payment amount data, and the like. The payment server executes a subsequent payment process based on the information in the first payment request and the second payment request. Optionally, the second payment request can further carry an instrument of the merchant in the payment system (referred to as a merchant instrument for short). The payment server verifies whether the merchant instrument is consistent with a locally stored merchant instrument, that is, verifies whether the merchant is registered with the payment system. If the merchant instrument carried in the second payment request is consistent with the locally stored merchant instrument, a subsequent operation 202 is executed. If the merchant instrument carried in the second payment request is inconsistent with the locally stored merchant instrument, it indicates that the merchant is not registered with the payment system, in other words, the merchant is unauthorized, and the data processing process is stopped. In this embodiment, the merchant instrument is verified, so as to further improve data processing security.

Specifically, if the user uses a PC to access a web page provided by the platform server, selects an appropriate commodity, and selects to make a payment, the platform server requests the payment server to display an instrument input page. The platform server displays the instrument input page, and the paying user can enter the payment instrument (such as a user name and a password) of the paying user on the page. Then, the PC sends, by using the first payment request, the payment instrument to the payment server for processing.

Operation 202. The payment server makes a payment based on the payment instrument of the payer, the merchant information, and the payment amount data.

Specifically, the payment server may verify whether the payment instrument of the payer is consistent with the previously stored payment instrument. For example, the payment server may verify whether a user name and a password that are carried in the first payment request are consistent with a user name and a password previously stored by the payment server. If the payment instrument of the payer is consistent with the previously stored payment instrument, the verification is considered to be successful; otherwise, the verification fails.

After the verification of the payment instrument is successful, the payment server makes the payment based on the payment amount data, the payment instrument, and the merchant information. For example, the payment server transfers the payment amount from an account corresponding to the user name to an account corresponding to the merchant.

Operation 203. The payment server generates a service verification code used to verify the commodity, and establishes a correspondence between the service verification code, the merchant information, and the commodity information.

Specifically, the payment server makes the payment based on the payment amount data, for example, the payment server makes a deduction from an account corresponding to the payment instrument of the user. If the deduction is successful, the service verification code is generated. The service verification code may be a string of code, and is used to verify the commodity purchased by the user. More specifically, the service verification code is used to verify whether a commodity requested by the user in subsequent consumption at the merchant is consistent with the commodity currently paid for by the user.

If the deduction fails, the payment process fails and the payment server returns a payment failure response to the user (a payment terminal).

The establishing the correspondence between the generated service verification code, the merchant information, and the commodity information can be understood as associating the service verification code, the merchant information, and the commodity information.

Operation 204. The payment server sends a first notification message to a terminal corresponding to the payer, where the first notification message carries the service verification code.

In one embodiment, the payment server can send the first notification message to a terminal preset by the paying user in the payment server (a default terminal for receiving a message), and can also send the first notification message to a mobile terminal that sends the first payment request (the terminal corresponding to the payer, referred to as the payment terminal for short). The first notification message may be sent by using an SMS message or by using a notification pushed by the payment application. The first notification message carries the generated service verification code. After obtaining the service verification code, the user may request, based on the service verification code, verification from a payment system located in a place where the merchant resides, and obtain the commodity or service provided by the merchant based on a service verification result.

In this embodiment of the present invention, when the payment server makes the payment based on the payment amount and the payment instrument of the payer, the payment server has obtained the merchant information and the commodity information of the commodity to be paid for, and after the payment is successful, establishes the correspondence between the service verification code, the merchant information, and the commodity information. Therefore, after the payment server sends the service verification code to the terminal corresponding to the payer, the user can perform verification on the payment system based on the service verification code. In this way, when the user who purchases commodities on different sales platforms and makes the payment by using a same payment system requests a commodity or a service from the merchant, the merchant only needs to verify a user-provided service verification code on the same payment system, instead of performing verification on different sales platforms. This improves verification efficiency and decreases transaction costs.

In addition, in this embodiment, the payment server generates the service verification code after the payment is successful and sends the service verification code to the terminal corresponding to the payer. The sales platform does not need to generate a service verification code or send the service verification code to the terminal. This reduces costs of the sales platform and costs of a seller.

In this embodiment, if the user purchases a cinema ticket for another person, such as a friend, by using the mobile terminal, a service verification code provided by the payment system can be sent to a terminal other than the payment terminal. Specifically, the payment server can further implement the following operations.

Operation 205. The payment server obtains an identifier of the terminal that receives the service verification code.

In one embodiment, when determining a desired commodity, the user sends, to the payment server by using the mobile terminal, the first payment request that carries the identifier of the terminal that receives the service verification code, and the payment server obtains, based on the first payment request, the identifier of the terminal that receives the service verification code. After obtaining the identifier, the payment server can associate the identifier with the service verification code, and execute operation 206.

In addition, the second payment request sent by the platform server can carry the identifier of the terminal that receives the service verification code. When determining the desired commodity, the user sends the identifier to the platform server by using the mobile terminal, and the platform server sends the identifier to the payment server. The terminal identifier can be a mobile station international service digital network (MSISDN) number.

Operation 206. The payment server sends a second notification message to the terminal that receives the service verification code, where the second notification message carries the service verification code, the commodity information, and the merchant information.

After the payment server sends the service verification code to the terminal, another user can request a corresponding commodity or service from the merchant based on the service verification code. If the terminal that receives the service verification code is the terminal corresponding to the payer, the first notification message and the second notification message are a same message.

If the user requests the corresponding commodity or service from the merchant based on the service verification code, the payment server executes operations 207 and 208.

Operation 207. The payment server receives a verification request, where the verification request carries the merchant information and a user-entered service verification code.

In one embodiment, the payment server can receive the verification request sent by the verification terminal. The verification request may include the merchant information and the service verification code. In addition, the verification request may further carry an identifier of the terminal that receives the service verification code. The verification request can be triggered by the user by entering the service verification code, or triggered by the merchant based on the user-provided service verification code and the terminal identifier.

Operation 208. The payment server searches the correspondence for the commodity information corresponding to the merchant information and the service verification code that are carried in the verification request, and displays the commodity information.

When verifying that the merchant information and the service verification code that are carried in the verification request are both in a one-to-one correspondence to the merchant information and the service verification code in the correspondence, the payment server determines that the verification is successful and returns the commodity information to the verification terminal for confirmation by the merchant.

Further, if the verification request further carries the commodity information of the user-selected commodity and the identifier of the terminal that provides the service verification code, in addition to the merchant information and the user-entered service verification code, operation 208 may be specifically as follows: The payment server verifies whether the terminal identifier carried in the request is consistent with the identifier obtained in operation 205. If the terminal identifier carried in the request is consistent with the identifier obtained in operation 205, subsequent verification starts; otherwise, the verification fails, indicating that the service verification code is used by another unauthorized user. The payment server verifies whether the merchant information, the service verification code, and the commodity information that are carried in the verification request are all in a one-to-one correspondence to the merchant information, the service verification code, and the commodity information in the previously established correspondence. If they are all in a one-to-one correspondence, the verification is successful; otherwise, the verification fails. For example, if the merchant information carried in the verification request is not corresponding to the merchant information in the previously established correspondence, the verification fails.

Figure 3:
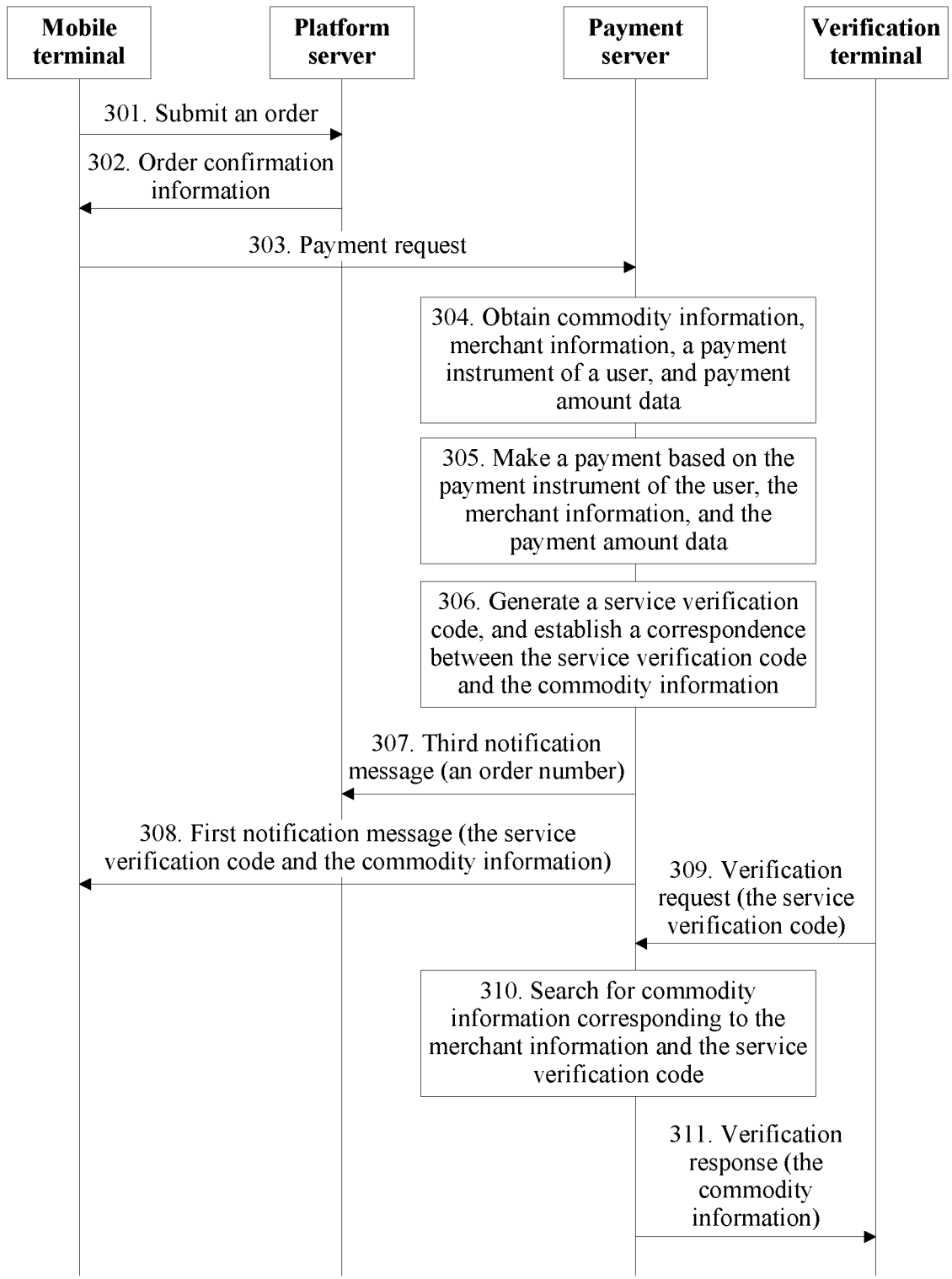
FIG. 3 is a flowchart of a data processing method according to one embodiment of the present invention.

Referring to FIG. 3, FIG. 3 is a flowchart of a data processing method according to one embodiment of the present invention.

In this embodiment, a user may purchase a cinema ticket on different shopping platforms. In this embodiment, a user submits an order request, to purchase two cinema tickets by using an application of the Groupon group purchase website on a mobile terminal at a price of RMB 50.00 yuan, and the data processing method according to this embodiment of the present invention includes the following operations:

Operation 301. The mobile terminal submits the order request to a platform server of the group purchase application.

In one embodiment, after selecting the cinema tickets on the Groupon application, the user submits the order request to the platform server of the Groupon application. The order request includes user-selected commodity information, merchant information, and an order amount. For example, the order request includes the following information:

Cinema: MGM International Cinema
Movie: The Martian
Seat: Line 7 of hall 8
Session: 2016-3-28 22:00
Price: RMB 50.00 yuan Operation 302. The platform server returns order confirmation information.

The platform server receives the order request submitted by the user, confirms the user-selected commodity information (for example, checks with the merchant sales system whether the user-selected cinema tickets are available), and generates an order after confirming that the cinema tickets are available. The order includes an order number. The platform server returns the order number to the mobile terminal.

The Groupon application on the mobile terminal also calls a payment application installed in the mobile terminal (for example, the Paypal application that uses the solutions in the present invention). The Groupon application sends the order number, the commodity information, the merchant information, and the payment amount data to a payment application. The payment application displays a payment interface to the user. The payment interface may include the order number, the commodity information, the merchant information, the payment amount data, and the like.

Operation 303. The mobile terminal sends a first payment request to a payment server.

The user performs an operation on the payment interface of the payment application to make a payment, and the mobile terminal sends the first payment request to the background server (the payment server) of the payment application. The payment request includes the order number, the commodity information, the merchant information, the payment amount data, and the payment instrument of the user. The user terminal can enter the payment instrument on the payment interface, or the Paypal application can automatically obtain the payment instrument. In this embodiment, the payment instrument is a user name and a password registered by the user with the payment system. If the user has logged in to the Paypal application, the Paypal application automatically obtains the payment instrument.

In this embodiment, if the user expects to use the currently used mobile terminal to receive the service verification code of the verified commodity, the first payment request further carries an identifier of the mobile terminal, such as an MSISDN number 13621524568, or an international mobile equipment identity (IMEI).

Operation 304. The payment server obtains the commodity information, the merchant information, the payment instrument of the user, and the payment amount data.

The payment server obtains the commodity information, the merchant information, the payment instrument of the user, and the payment amount data by parsing the first payment request. In addition, the payment server may also obtain the order number and the identifier of the mobile terminal.

In this embodiment, the payment instrument of the user is the user name and password of the user in the payment system.

Operation 305. The payment server makes a payment based on the payment instrument of the user, the merchant information, and the payment amount data.

In one embodiment, the payment server verifies whether the user name and the password are consistent with a user name and a password stored in the payment server. If they are consistent, the payment server transfers the payment amount from an account corresponding to the user name to an account corresponding to the merchant. If the transfer is successful, operation 306 is executed; otherwise, the user is notified of a payment failure. It should be noted that the payment server may also transfer the payment amount from the account corresponding to the user name to an intermediate account, and associate the transfer with the account of the merchant. When the user confirms consumption at the merchant, the payment server transfers the payment amount from the intermediate account to the associated account of the merchant, improving transaction security.

If the user name and password in the first payment request are inconsistent with the user name and password stored in the payment server, the transfer fails and the user is notified of a payment failure.

Operation 306. The payment server generates a service verification code used to verify the commodity, and establishes a correspondence between the service verification code, the merchant information, the commodity information, and the terminal identifier.

In one embodiment, after successful transfer, the payment server generates the service verification code for verifying the cinema ticket, for example, 65954123.

The correspondence established by the payment server is shown in the following table.

| Service verification code | Commodity information | Merchant information | Terminal identifier |
|---|---|---|---|
| 65954123 | Cinema ticket - The Martian | MGM International Cinema | 13621524568 |

Operation 307. The payment server sends a third notification message to the platform server, where the third notification message carries the order number.

In one embodiment, after the payment is completed, the payment server sends the third notification message to the platform server where the payment is made by using the Paypal. The third notification message carries the order number of the order for which the payment is made, so that the platform server is notified that payment is made for the order. The platform server can associate the user-selected cinema tickets and cinema based on the order number.

Operation 308. The payment server sends a first notification message to the mobile terminal, where the first notification message carries the service verification code, the commodity information, and the merchant information.

In one embodiment, the payment server can send the service verification code, the commodity information, and the merchant information to the mobile terminal by using a notification pushed by the Paypal application. The notification message pushed by the Paypal application carries the service verification code (65954123), the commodity information (Cinema ticket—The Martian), and the merchant information (MGM International Cinema). The verification code may be displayed in a form of a two-dimensional code or a bar code.

The user carries the mobile terminal to the MGM International Cinema for consumption. Before watching the movie, the user needs to have the service verification code verified on the verification terminal.

The verification terminal is specifically a self-service terminal that is deployed at a place where the cinema resides and specifically includes a display, a keyboard, and a bar-code scanner. The user uses the mobile terminal to show the verification code to the verification terminal and enters the terminal identifier 13621524568. After obtaining the information, the verification terminal sends a verification request to the payment server. The verification request further carries the merchant information (automatically obtained by the verification terminal), that is, MGM International Cinema.

Operation 309. The payment server receives the verification request sent by the verification terminal, where the verification request carries the merchant information, the terminal identifier, and a user-entered service verification code.

The payment server and the verification terminal are in an encrypted connection. The verification request is encrypted and transmitted to the payment server, to enhance transaction security.

Operation 310. The payment server searches, based on the verification request, the previously stored correspondence for the commodity information corresponding to the merchant information, the terminal identifier, and the service verification code that are carried in the verification request.

In one embodiment, the payment server can first verify whether formats (for example, a number of digits) of the service verification code and the terminal identifier are correct. If the formats are both correct, the payment server further searches the previously stored correspondence for the commodity information corresponding to the merchant information, the terminal identifier, and the service verification code that are carried in the verification request.

Operation 311. The payment server returns a verification response that carries the commodity information to the payment terminal.

If the corresponding commodity information is found, the payment server returns the verification response to the verification terminal. The response carries the commodity information, for example, the cinema ticket information. In this embodiment, after finding the cinema ticket, the payment server can further mark the cinema ticket to indicate that the cinema ticket has been consumed at the MGM International Cinema, and an identifier of a terminal of a consuming user is 13621524568.

If the corresponding commodity information is not found, the payment server returns the verification response to the verification terminal. The response carries verification failure information.

In addition, if the payment server verifies that the formats of the service verification code and the terminal identifier are not correct in the operation 310, the payment server returns the verification response carrying the verification failure information.

After receiving the verification response, the verification terminal displays the carried verification failure information or the commodity information (the cinema ticket information in this embodiment) for the user to confirm. In this embodiment, the verification terminal can directly print out the cinema ticket or prompts admission of the user. The user can enter into a movie hall by ticket only or directly enter into the hall, to watch the movie.

The foregoing takes one user as an example to detail the data processing process according to this embodiment of the present invention. If a plurality of users purchase cinema tickets of the cinema on shopping platforms provided by different platform servers, the payment server and the corresponding platform servers execute the above method process repeatedly. In this embodiment of the present invention, a plurality of users use a same payment system to make a payment when purchasing commodities, and the payment server establishes correspondences between the service verification code, the merchant information, and the commodity information after the payment is successful. To perform consumption at the cinema, all these users can perform verification on the same payment system based on the service verification code, instead of performing verification on different shopping platforms. This improves verification efficiency and decreases transaction costs.

In addition, in this embodiment of the present invention, the user does not need to verify the commodity information on different sales platforms, and the sales platforms do not need to deploy self-service terminals having a verification function at the merchant. This decreases costs of the sales platforms.

Figure 4:
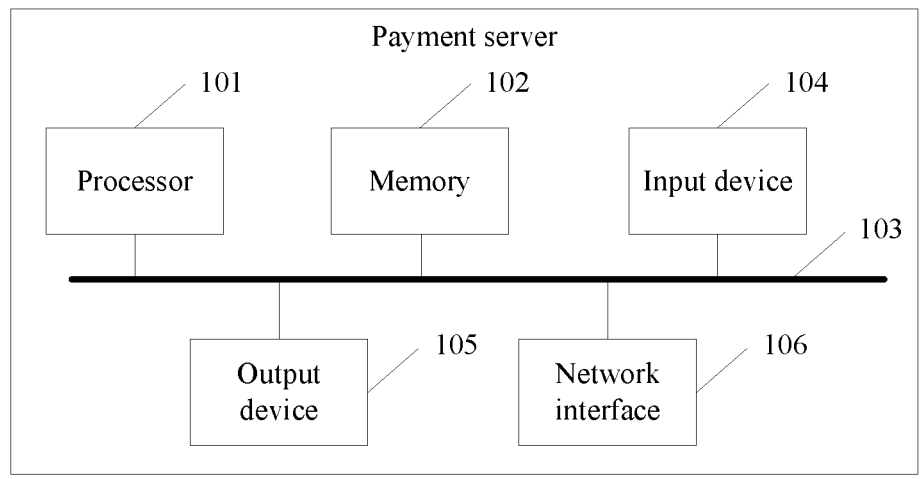
FIG. 4 is a schematic structural diagram of a payment server according to one embodiment of the present invention.

Referring to FIG. 4, FIG. 4 is a schematic structural diagram of a payment server according to one embodiment of the present invention.

The payment server can be the payment server 10 shown in FIG. 1. The payment server device uses universal computer hardware, including a processor 101, a memory 102, a bus 103, an input device 104, an output device 105, and a network interface 106.

In one embodiment, the memory 102 may include a computer storage medium in a form of a volatile and/or a non-volatile memory, such as a read-only memory and/or a random access memory. The memory 102 can store an operating system, an application, another program module, executable code, and program data.

The input device 104 can be configured to enter an instruction and information to the payment server and can be a keyboard or a pointing device, such as a cursor mouse, a trackball, a touchpad, a microphone, a joystick, a play mat, a satellite dish, a scanner, or a similar device. The input device may be connected to the processor 101 by using the bus 103.

The output device 105 can be configured for the payment server to output information. The output device 105 may be a monitory or may alternatively be another peripheral output device, such as a loudspeaker and/or a printing device. The output device may also be connected to the processor 101 by using the bus 103.

The payment server can be connected to a network, such as a local area network (LAN) by using the network interface 106. In a network environment, a computer execution instruction stored in the payment server can be stored in a remote storage device, and is not limited to being locally stored.

When the processor 101 in the payment server executes executable code or an application stored in the memory 102, the payment server can execute the method operation at the payment server side in the foregoing embodiments, such as the operations 201 to 208, the operations 304 to 307, and the operations 310 and 311, with a same beneficial effect. For a specific execution process, refer to the foregoing embodiments, and details are not described herein again.

Figure 5:
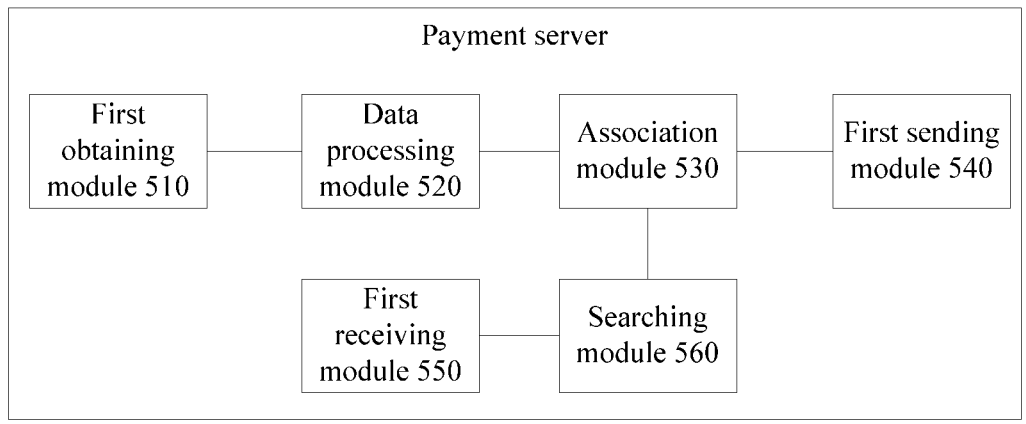
FIG. 5 is a schematic structural diagram of a payment server according to one embodiment of the present invention.

Referring to FIG. 5, FIG. 5 is a schematic structural diagram of a payment server according to one embodiment of the present invention.

As shown in the figure, the payment server according to this embodiment of the present invention includes a first obtaining module 510, a data processing module 520, an association module 530, and a first sending module 540.

The first obtaining module 510 is configured to obtain commodity information of a commodity to be paid for, merchant information, a payment instrument of a payer, and payment amount data. Specifically, the first obtaining module 510 can be configured to perform the operations 201, 205, and 304 in the foregoing embodiments. For a specific execution process, refer to descriptions in the foregoing method embodiments.

The data processing module 520 is configured to make a payment based on the payment instrument of the payer, the merchant information, and the payment amount data. Specifically, the data processing module 520 can be configured to perform the operations 202 and 305 in the foregoing embodiments. For a specific execution process, refer to descriptions in the foregoing method embodiments.

The association module 530 is configured to generate a service verification code used to verify the commodity and establish a correspondence between the service verification code, the merchant information, and the commodity information. Specifically, the association module 530 can be configured to perform the operations 203 and 306 in the foregoing embodiments. For a specific execution process, refer to descriptions in the foregoing method embodiments.

The first sending module 540 is configured to send a first notification message to a terminal corresponding to the payer, where the first notification message carries the service verification code. Specifically, the first sending module 540 can be configured to perform the operations 204, 206, 307, and 308 in the foregoing embodiments. For a specific execution process, refer to descriptions in the foregoing method embodiments.

The payment server according to this embodiment of the present invention can be used in the foregoing methods. The first obtaining module 510, the data processing module 520, the association module 530, and the first sending module 540 cooperate with each other to complete the method at the payment server side in the embodiments as described above. Compared with a prior-art payment server, the payment server according to this embodiment renders a same beneficial effect as that in the foregoing method embodiments when performing data processing.

Specifically, that the first obtaining module 510 of the payment server obtains the commodity information of the commodity to be paid for, the merchant information, and the payment amount data includes:

receiving a first payment request sent by the terminal corresponding to the payer, where the first payment request carries the payment instrument of the payer and the merchant information; and receiving a second payment request sent by a platform server, where the second payment request carries the commodity information of the commodity to be paid for, the merchant information, and the payment amount data.

Further, the payment server in FIG. 5 includes a first receiving module 550 and a searching module 560.

The first receiving module 550 is configured to receive a verification request sent by a verification terminal, where the verification request carries the merchant information and a user-entered service verification code. Specifically, the first receiving module 550 can be configured to perform the operations 207 and 309 in the foregoing embodiments. For a specific execution process, refer to descriptions in the foregoing method embodiments.

The searching module 560 is configured to search the correspondence for commodity information corresponding to the merchant information and the service verification code that are carried in the verification request, and return the commodity information to the verification terminal. Specifically, the searching module 560 can be configured to perform the operations 208, 310, and 311 in the foregoing embodiments. For a specific execution process, refer to descriptions in the foregoing method embodiments.

In the payment server according to this embodiment, the first obtaining module 510 is further configured to obtain an identifier of the terminal that receives the service verification code.

The first sending module 540 is further configured to send a second notification message to the terminal that receives the service verification code, where the second notification message carries the service verification code, the commodity information, and the merchant information. In addition, the second notification message further carries the commodity information and the merchant information so that the terminal that receives the service verification code can perform consumption at the merchant based on the commodity information. This improves consumption flexibility and convenience.

According to the payment server in this embodiment, the first payment request further carries an order number used to identify a transaction event (namely, a transaction fact that the user purchases a commodity). The first sending module 540 is further configured to send a third notification message to the platform server after the payment is successful and the third notification message carries the order number. In this way, the platform server learns that the order is paid successfully and records the payment at a background.

In this embodiment, the payment server is represented in a form of a function unit. The unit may refer to an application-specific integrated circuit (application-specific integrated circuit, ASIC), a circuit, a processor that executes one or more software or firmware programs and a storage, an integrated logic circuit, and/or another component that can provide the foregoing functions. In a simple embodiment, a person skilled in the art can realize that the payment server may also be in a form shown in FIG. 4. Functions that are implemented by the first obtaining module 510, the data processing module 520, the association module 530, the first sending module 540, the first receiving module 550, and the searching module 560 can be implemented by the processor 101 and the memory 102 in FIG. 4. For example, that the first obtaining module 510 obtains commodity information of the commodity to be paid for, the merchant information, the payment instrument of the payer, and the payment amount data can be implemented by executing the code stored in the memory 102 by the processor 101.

The processor configured to implement functions of the electronic device and the system in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

A person of ordinary skill in the art will understand that each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method of communications, comprising:
　receiving, by a processor of a payment server, commodity information of a commodity, merchant information, a payment instrument of a payer, and payment amount data, the payment server being separated from a sales platform;
　making, by the processor of the payment server, a payment based on the payment instrument of the payer, the merchant information, and the payment amount data;
　in response to the payment being successful, generating, by the processor of the payment server, a service verification code to be used to verify whether a commodity to be requested by a user in a consumption of the commodity at a merchant is consistent with the commodity purchased by the payer on the sales platform, and establishing a correspondence between the service verification code, the merchant information, and the commodity information by associating the service verification code with the merchant information and the commodity information;
　sending, by the processor of the payment server, a first notification message to a terminal corresponding to the payer, wherein the first notification message includes the service verification code, and wherein the service verification code corresponding to the merchant information and the commodity information is used to perform a verification on a payment system to avoid performing a verification on the sales platform to improve a verification efficiency and reduce a burden of the sales platform;
　receiving, by the processor of the payment server, a verification request from a verification terminal in response to the user requesting the commodity to perform the consumption of the commodity at the merchant, wherein the verification request includes the service verification code entered by the user to verify the commodity and the merchant information;
　searching for the commodity information corresponding to the merchant information and the service verification code that are included in the verification request based on the correspondence; and
　sending, by the processor of the payment server, a verification response that carries the commodity information based on the verification request.

2. The method according to claim 1, wherein the receiving commodity information of a commodity, merchant information, and payment amount data comprises:
　receiving a first payment request from the terminal corresponding to the payer, wherein the first payment request includes the payment instrument of the payer and the merchant information; and
　receiving a second payment request from a platform server, wherein the second payment request includes commodity information of a commodity to be paid for, merchant information, and payment amount data.

3. The method according to claim 2, wherein the second payment request further includes a merchant instrument, and the method further comprises:
　verifying whether the merchant instrument included in the second payment request is consistent with a locally stored merchant instrument; and
　if the merchant instrument included in the second payment request is consistent with the locally stored merchant instrument, triggering execution of the making a payment based on the payment instrument of the payer, the merchant information, and the payment amount data.

4. The method according to claim 2, further comprising:
　receiving an identifier of the terminal that receives the service verification code; and
　transmitting a second notification message to the terminal that receives the service verification code, wherein the second notification message includes the service verification code, the commodity information, and the merchant information.

5. The method according to claim 4, further comprising:
　establishing a correspondence between the generated service verification code and the identifier of the terminal that receives the service verification code.

6. The method according to claim 4, wherein the second notification message further includes the commodity information and the merchant information.

7. The method according to claim 2, wherein the first payment request further includes an order number used to identify a transaction event, and the method further comprises:
　sending a third notification message to the platform server after the payment is successful, wherein the third notification message includes the order number.

8. A payment server being separated from a sales platform, the payment server comprising:
　a processor; and
　a memory coupled to the processor to store instructions, which when executed by the processor, cause the processor to perform operations, the operations including
　receiving commodity information of a commodity, merchant information, a payment instrument of a payer, and payment amount data;
　making a payment based on the payment instrument of the payer, the merchant information, and the payment amount data;
　in response to the payment being successful, generating a service verification code to be used to verify whether a commodity to be requested by a user in a consumption of the commodity at a merchant is consistent with the commodity purchased by the payer on the sales platform, and establishing a correspondence between the service verification code, the merchant information, and the commodity information by associating the service verification code with the merchant information and the commodity information;
　sending a first notification message to a terminal corresponding to the payer, wherein the first notification message includes the service verification code, and wherein the service verification code corresponding to the merchant information and the commodity information is used to perform a verification on a payment system to avoid performing a verification on the sales platform to improve a verification efficiency and reduce a burden of the sales platform;

receiving a verification request from a verification terminal in response to the user requesting the commodity to perform the consumption of the commodity at the merchant, wherein the verification request includes the service verification code entered by the user to verify the commodity and the merchant information;

searching for the commodity information corresponding to the merchant information and the service verification code that are included in the verification request based on the correspondence; and sending a verification response that carries the commodity information based on the verification request.

9. The payment server according to claim 8, wherein the operations further include receiving an identifier of the terminal that receives the service verification code; and sending a second notification message to the terminal that receives the service verification code, wherein the second notification message includes the service verification code, the commodity information, and the merchant information.

10. The payment server according to claim 9, wherein the second notification message further includes the commodity information and the merchant information.

11. The payment server according to claim 8, wherein the receiving the commodity information of the commodity, the merchant information, and the payment amount data comprises:

receiving a first payment request from the terminal corresponding to the payer, wherein the first payment request includes the payment instrument of the payer and the merchant information; and receiving a second payment request from a platform server, wherein the second payment request includes commodity information of a commodity to be paid for, merchant information, and payment amount data.

12. The payment server according to claim 11, wherein the first payment request further includes an order number used to identify a transaction event, and wherein the operations further include:

sending a third notification message to the platform server after the payment is successful, wherein the third notification message includes the order number.

13. A non-transitory computer-readable medium having instructions stored therein, which when executed by a processor, cause the processor to perform operations, the operations comprising:

receiving commodity information of a commodity, merchant information, a payment instrument of a payer, and payment amount data;

making a payment based on the payment instrument of the payer, the merchant information, and the payment amount data;

in response to the payment being successful, generating a service verification code to be used to verify whether a commodity to be requested by a user in a consumption of the commodity at a merchant is consistent with the commodity purchased by the payer on a sales platform, and establishing a correspondence between the service verification code, the merchant information, and the commodity information by associating the service verification code with the merchant information and the commodity information; and sending a first notification message to a terminal corresponding to the payer, wherein the first notification message includes the service verification code, and wherein the service verification code corresponding to the merchant information and the commodity information is used to perform a verification on a payment system to avoid performing a verification on a sales platform to improve a verification efficiency and reduce a burden of the sales platform;

receiving, by a processor of a payment server, a verification request from a verification terminal in response to the user requesting the commodity to perform the consumption of the commodity at the merchant, wherein the verification request includes the service verification code entered by the user to verify the commodity and the merchant information;

searching for the commodity information corresponding to the merchant information and the service verification code that are included in the verification request based on the correspondence; and sending, by the processor of the payment server, a verification response that carries the commodity information based on the verification request.

14. The computer-readable medium according to claim 13, wherein the receiving commodity information of a commodity, merchant information, and payment amount data comprises:

receiving a first payment request from the terminal corresponding to the payer, wherein the first payment request includes the payment instrument of the payer and the merchant information; and receiving a second payment request from a platform server, wherein the second payment request includes commodity information of a commodity to be paid for, merchant information, and payment amount data.

15. The computer-readable medium according to claim 14, wherein the second payment request further includes a merchant instrument, and wherein the operations further comprise:

verifying whether the merchant instrument included in the second payment request is consistent with a locally stored merchant instrument; and if the merchant instrument included in the second payment request is consistent with the locally stored merchant instrument, triggering execution of the making a payment based on the payment instrument of the payer, the merchant information, and the payment amount data.

16. The computer-readable medium according to claim 14, wherein the operations further comprise:

obtaining an identifier of the terminal that receives the service verification code; and sending a second notification message to the terminal that receives the service verification code, wherein the second notification message includes the service verification code, the commodity information, and the merchant information.

17. The computer-readable medium according to claim 16, wherein the operations further comprise establishing a correspondence between the generated service verification code and the identifier of the terminal that receives the service verification code.

* * * * *

UNITED STATES PATENT AND TRADEMARK OFFICE
CERTIFICATE OF CORRECTION

| | |
|---|---|
| PATENT NO. | : 11,436,573 B2 |
| APPLICATION NO. | : 16/212610 |
| DATED | : September 6, 2022 |
| INVENTOR(S) | : Heng Jiang |

It is certified that error appears in the above-identified patent and that said Letters Patent is hereby corrected as shown below:

In the Claims

In Claim 13, Column 20, Line 9-10, delete "verification on a sales platform" and insert --verification on the sales platform--.

Signed and Sealed this
Tenth Day of January, 2023

Katherine Kelly Vidal
*Director of the United States Patent and Trademark Office*